United States Patent [19]
Wick et al.

[11] 3,873,012
[45] Mar. 25, 1975

[54] PHOTOGRAPHIC COPYING MACHINE

[75] Inventors: Richard Wick, Munich; Berthold Fergg, Taufkirchen; Wolfgang Zahn, Munich; Erich Nagel, Anzing; Mathias Pflugbeil, Baldham; Christian Gotze, Munich; Adolf Fleck, Munich; Karl Dreher, Munich, all of Germany

[73] Assignee: Agfa-Gevaert Aktiengesellschaft, Leverkusen, Germany

[22] Filed: Sept. 14, 1973

[21] Appl. No.: 397,247

[30] Foreign Application Priority Data
Sept. 15, 1972 Germany.............................. 2245309

[52] U.S. Cl.................................. 226/44, 226/118
[51] Int. Cl............................................. B65h 25/04
[58] Field of Search ............ 226/26, 42, 43, 44, 45, 226/118

[56] References Cited
UNITED STATES PATENTS
| | | | |
|---|---|---|---|
| 2,797,086 | 6/1957 | Cohn | 226/26 |
| 3,078,023 | 2/1963 | Hecker | 226/196 X |
| 3,225,989 | 12/1965 | Stine | 226/44 |

*Primary Examiner*—Richard A. Schacher
*Attorney, Agent, or Firm*—Michael S. Striker

[57] ABSTRACT

A photographic copying machine wherein the copying station is located between two feeding stations for a web of photographic material. The web is guided by fixedly mounted and pivotable guide members which define at each feeding station an opening through which loop-shaped intermediate portions of the web can enter a basket-shaped magazine. Two intermittently driven wheels at the first feeding station draw the web from a supply cassette and feed it directly into the adjacent magazine from which the web is withdrawn by intermittently driven wheels at the second feeding station whereby the web enters the other magazine from which it is withdrawn in response to rotation of the takeup reel in a second cassette. Pivotable flaps can seal the magazines from the path for the web during threading of the leader of a fresh web into the copying machine, and forked intercepting devices are provided adjacent to the magazines to intercept folded-over portions of the web.

22 Claims, 4 Drawing Figures

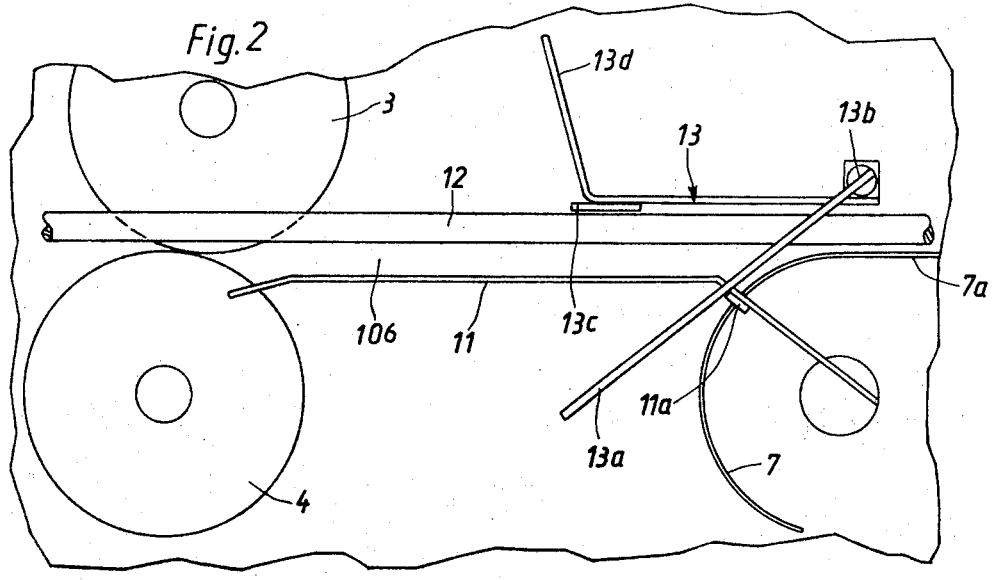
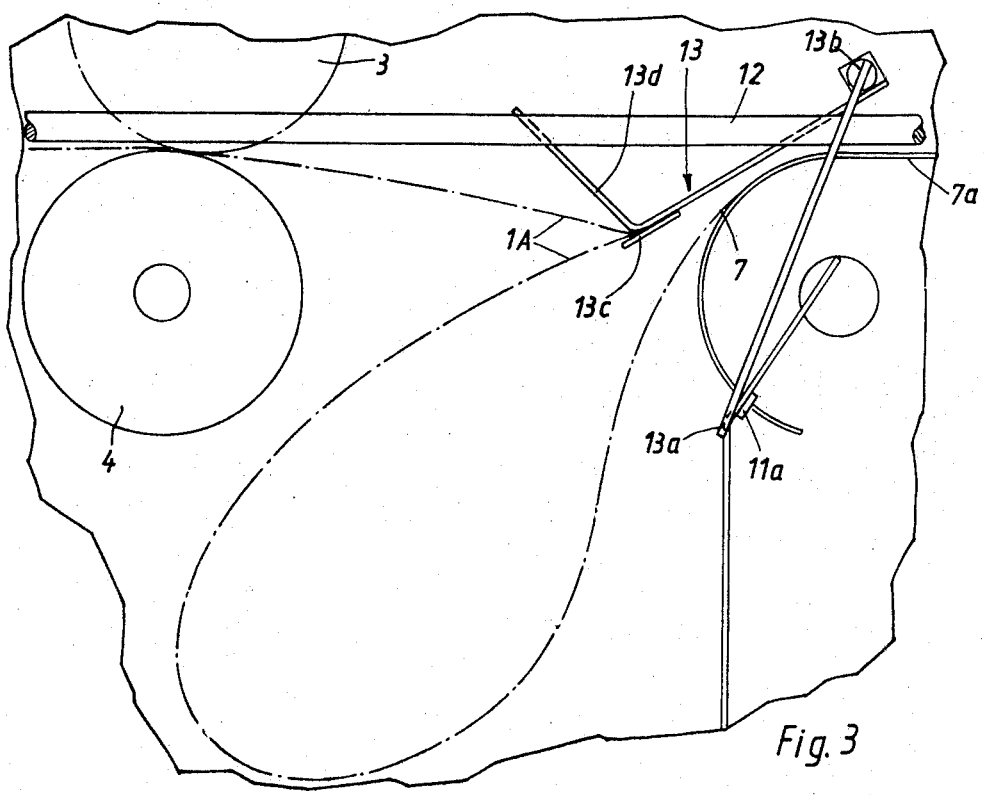

PHOTOGRAPHIC COPYING MACHINE

BACKGROUND OF THE INVENTION

The present invention relates to photographic copying machines wherein a web of photographic material (such as a strip of paper coated with a layer of photosensitive material) is advanced intermittently to move successive portions of photosensitive material into register with the original and printing light at a copying station.

It is already known to provide a photographic copying machine with guides which define an elongated path wherein the web is fed lengthwise and in stepwise fashion so as to insure that an unexposed portion of photosensitive material registers with the original at the copying station prior to the exposure of such portion to printing light. It is further known to provide such photographic copying machines with two discrete transporting units and with a magazine between the two transporting units. The purpose of the magazine is to store a certain length of the web which suffices to insure that the second transporting unit can move the web lengthwise through distances of identical length without being compelled to draw the web directly off the reel in a supply cassette or the like. As a rule, the magazines of conventional printing machines employ sets of rolls which define for the web an elongated meandering path. Such magazines occupy much room and the copying machine must be provided with complex threading means if the leader of a fresh web is to be automatically advanced from the first transporting unit, through the magazine and to the second transporting unit. Moreover, the rolls oppose the lengthwise movement of a properly threaded web with a substantial force so that the second transporting unit must forcibly pull the web which can cause misalignment, tearing and/or other inconveniences.

SUMMARY OF THE INVENTION

An object of the invention is to provide a novel and improved photographic copying machine wherein the magazine between two spaced-apart transporting means for a web of photographic material is much simpler than but just as effective as the magazines of conventional copying machines.

Another object of the invention is to provide a novel and improved magazine for the storage of variable lengths of web-like photographic material in a region upstream and/or downstream of the copying station.

A further object of the invention is to provide novel and improved means for guiding the web on its way toward or from the magazine and novel and improved means for transporting the web into and for drawing the web from the magazine.

An additional object of the invention is to provide a magazine whose parts offer a negligible resistance to introduction of photographic material into its interior or to withdrawal of photographic material therefrom.

A further object of the invention is to provide novel and improved means for regulating the rate of feed of photographic material into and for regulating the rate of material feed from the magazine.

Still another object of the invention is to provide novel means for facilitating the threading of the leader of a fresh web through a copying machine which embodies the improved magazine.

An additional object of the invention is to provide novel and improved guide members for the web upstream, at and downstream of the magazine.

A further object of the invention is to provide a copying machine wherein the magazine, the transporting means for the web and certain additional parts can be assembled into one or more prefabricated modules to thus facilitate the transport, assembly, testing, inspection, adjustment, repair and/or replacement in the manufacturing plant and/or at the locale of use.

The invention is embodied in a photographic copying machine wherein a web of phoographic photographic is advanced lengthwise in a predetermined direction and along an elongated path which extends toward, through and beyond a suitable copying station. The machine comprises a plurality of guide members which flank the path at opposite sides and define at least one opening through which an intermediate portion of a web in the path can extend from the path, a magazine which is adjacent to the opening and is positioned to receive that intermediate portion of a web in the path which is caused to leave the path through the opening, (the magazine has confining means which preferably resembles a ladder and contacts only one side of the web portion in the magazine to thus reduce the likelihood of damage to the web and/or the resistance which the web offers to withdrawal from the magazine), first transporting means which is located ahead of the opening and serves to feed the web lengthwise so that the length of the web portion in the magazine increases when the rate at which the web is being fed into the magazine exceeds the rate at which the web is being withdrawn from the magazine, and second transporting means located downstream of the opening and arranged to intermittently draw the web from the magazine. The magazine and the first transporting means can be located at a first feeding station which is disposed upstream of the copying station, and the second transporting means may be installed at a second feeding station which is located downstream of the copying station.

The novel features which are considered as characteristic of the invention are set forth in particular in the appended claims. The improved copying machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged view of a detail in the structure of FIG. 1, with the parts shown in positions they assume during threading of the leader of a fresh web past a magazine;

FIG. 3 illustrates the structure of FIG. 2 but with the parts shown in positions they assume subsequent to threading.

DESCRIPTION OF THE PREFERRED EMBODIMENTS

Figure 1:
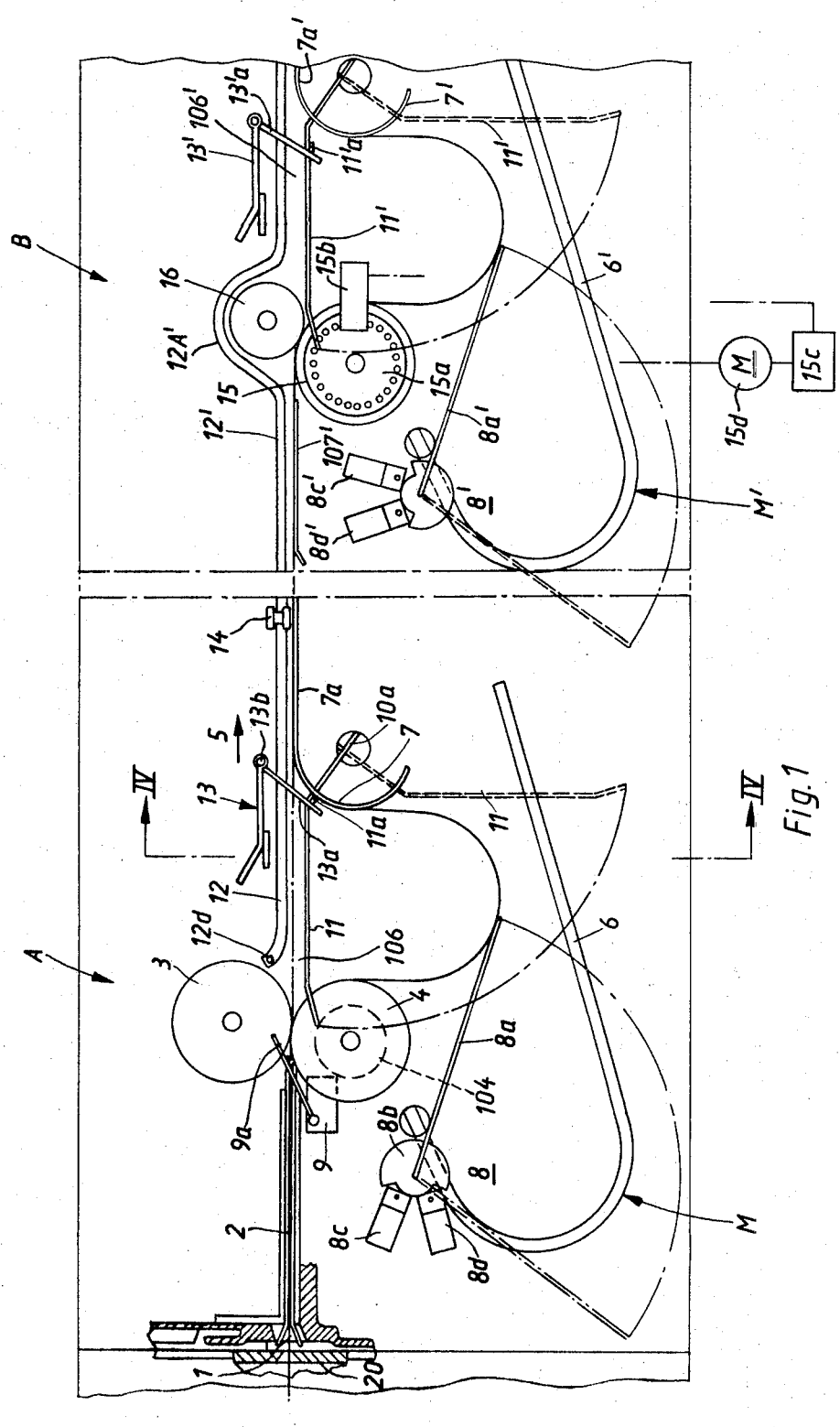
FIG. 1 is a fragmentary schematic partly elevational and partly sectional view of a photographic copying machine which embodies the invention, with the copying station omitted.

FIG. 1 illustrates two spaced-apart web feeding stations A and B which are respectively located upstream and downstream of a copying or printing station of the type disclosed, for example, in the commonly owned copending application Ser. No. 396,457 filed Sept. 12, 1973 by Goetze, et al. The web 1 is stored in a cassette 20 which is located to the left of the feeding station A and the web is to be collected in a second cassette (not shown) which is located to the right of the feeding station B. The mounting of the cassette 20 is such that the web 1 is advanced with its emulsion-coated side facing downwardly.

The outlet of the cassette 20 is adjacent to a channel 2 which is removably installed in the frame of the copying machine and has lateral guide portions (not specifically shown) serving to effect a preliminary of coarse centering of the web during travel toward the nip of two rotary transporting members in the form of wheels or rolls 3, 4 located at the feeding station A. The channel 2 is replaced with a narrower or wider channel when the web 1 is followed by a narrower or wider web.

The wheel 4 is driven by an intermittently operated motor 104 and the wheel 3 is biased downwardly by a set of springs or the like so that it can cooperate with the wheel 4 for the purpose of advancing the web 1 lengthwise in a direction (arrow 5) toward the copying station where the web is exposed to light passing through or reflected by an original.

The transporting wheels 3, 4 are followed by a magazine M which can store a floating supply of looped web 1 and from which the transporting wheels 15, 16 at the second feeding station B can draw predetermined lengths of web at regular or irregular intervals. The magazine M comprises a basket-shaped confining frame 6 including two partly arcuate and partly straight sidepieces 6a, 6b of highly polished metallic rod stock and transversely extending crosspieces or rungs 6c (see FIG. 4) which are attached to the outer sides of the sidepieces 6a, 6b so that they cannot contact the emulsion side of the web 1. The magazine M further comprises an arcuate shroud 7 whose convex side faces the upper sides of the sidepieces 6a, 6b and which serves to direct the web 1 into that portion of the path wherein the web moves on its way into, through and beyond the copying station. The distance between the sidepieces 6a, 6b is less than the width of the narrowest web which is to be treated in the copying machine so that the sidepieces can properly support the narrowest web provided that the latter is properly centered in the magazine M. The configuration, length and positioning of the confining frame 6 depend on the size and configuration of the space which is available at the feeding station A at a level below the path of the web 1. The magazine M can be enlarged or reduced in size and made deeper or shallower, longer or shorter or lengthwise altered to insure an optimum utilization of space at the feeding station A.

The magazine M can receive an intermediate portion of the web 1 through an opening 106 which is adjacent to the wheel 4. The confining frame 6 has an arcuate portion which is nearer to the left-hand end of the opening 106 and a straight portion which is adjacent to the shroud 7 at the right-hand end of the opening 106. The confining frame 6 resembles a deformed ladder whose left hand end has been bent upwardly toward the intermittently driven transporting wheel 4.

The looped web 1 in the magazine M is monitored by a detector 8 having an elongated arm 8a of spring steel stock or the like and serving to turn an opaque vane 8b for two photoelectric sensors 8c, 8d. The vane 8b interrupts the light beam between the light source and the photosensitive element of the sensor 8d when the magazine M is filled. The light beam between the light source and the photosensitive element of the sensor 8c is interrupted when the magazine M is empty or substantially empty. Thus, the signals which are furnished by the sensors 8c, 8d respectively indicate the minimum and maximum permissible length of material which is stored in the magazine M. The pivot axis for the arm 8a of the detector 8 is located in the region of the upper left-hand portion of the magazine M at a level close to and below the intermittently driven transporting wheel 4.

A further detector 9 is mounted close to the discharge end of the channel 2. This detector is a microswitch having a pivotable arm 9a which extends across the path of movement of the web 1 between the channel 2 and the nip of the transporting wheels 3, 4. The microswitch 9 controls the motor 104 for the wheel 4.

The shroud 7 partially surrounds a rotary electromagnet 10 (see also FIG. 4) having a shaft 10a for a pivotable guide member or flap 11 which can be pivoted between the solid line and broken-line positions of FIG. 1. When the solid-line position and thereby closes the opening 106 at the upper end of the magazine M so that the web 1 is compelled to bypass the magazine and to advance toward the copying station. When the electromagnet 10 is deenergized, the flap 11 pivots by gravity to the broken-line position of FIG. 1 and permits an intermediate portion of a web 1 to enter the magazine M. It will be noted that the axis of the wheel 3 is located slightly to the right of the axis of the wheel 4 so that the leader of a fresh web 1 which reaches the nip of the wheels 3, 4 is caused to move downwardly and to thus automatically enter the magazine M by way of the opening 106 when the flap 11 assumes the broken-line position of FIG. 1. This is due to the fact that a line which is tangent to and is disposed between the wheels 3 and 4 extends into the magazine M through the opening 106.

The magazine M is followed by a second channel which is formed by a horizontal extension 7a of the shroud 7 and an elongated upper guide member 12 having a suitably curved rear end to intercept the leader of a fresh web 1 and to cause such leader to enter the space above the extension 7a. The guide member 12 resembles the confining frame 6 and comprises two parallel sidepieces 12a, 12b of highly polished round metallic stock (see FIG. 4) and transversely extending crosspieces or rungs 12c which do not contact the web in the channel 7a, 12. The left-hand end of the guide member 12 is pivotally mounted in the frame of the copying machine, as at 12d, so that the space above the extension 7a is readily accessible for cleaning or for another purpose as soon as the guide member 12 is pivoted above and away from the path for the web 1. The distance between the sidepieces 12a, 12b of the frame member 12 preferably equals or approximates the distance between the sidepieces 6a, 6b of the confining frame 6.

An intercepting device 13 is pivotably mounted on a horizontal pin 13b and has a downwardly inclined follower 13a which abuts against a projection or stop 11a of the flap 11 at least when the latter assumes the solid-line position of FIG. 1. As shown in FIGS. 2 and 3, the intercepting device 13 is pivotable between an operative portion (FIG. 3) in which an intercepting portion or ledge 13c can intercept a folded-over portion 1A of the web 1. The crosspieces 12c of the guide member 12 are distributed in such a way that they cannot interfere with pivotal movements of the intercepting device 13 between the positions shown in FIGS. 2 and 3. The device 13 may consist of sheet metal and is automatically removed from the path of the web 1 when the flap 11 assumes the position shown in FIG. 2 in which it closes the opening 106 at the upper end of the magazine M. The intercepting portion 13c is secured to the adjacent supporting portion 13d of the device 13 by spot welding and extends into the path of movement of the folded-over portion of a web 1 when the flap 11 assumes the inoperative position of FIG. 3. The portion 13c is then located in front of the convex external surface of the shroud 7 and at a level below the guide member 12. It will be noted that the portions 13c, 13d diverge in a direction toward the wheels 3, 4.

The function of the intercepting device 13 is as follows: A web 1 can comprise one or more splices (one such splice is assumed to be located at 1A in FIG. 3) where two or more sections of photographic paper are connected to each other by means of customary adhesive-coated bands. Therefore, the web tends to buckle in the region of a splice and, in the absence of the intercepting device 13, two web portions which are respectively located upstream and downstream of a splice would be likely to become folded over each other so that the channel between the guide member 12 and extension 7a could receive as many as three layers of photographic paper. This could affect the operation at the copying station and/or at the second feeding station B. When the intercepting device 13 assumes the position FIG. 3 and a splice (at 1A) penetrates into the space between the portions 13c and 13d, the web portions which flank the splice are free to move toward each other but the thus folded parts of the web cannot enter the channel between the guide member 12 and extension 7a. The splice becomes flat in automatic response to activation of transporting wheels 15, 16 at the feeding station B so that the transport of web 1, in folded-over conditions is prevented. If the wheels 3, 4 continue to feed the web into the magazine M while 3, 4 continue to feed the web into the magazine M while a splice extends into the substantially v-shaped space between the portions 13c, 13d of the intercepting device 13, the web simply forms a second loop behind the splice and such second loop is compelled to enter the magazine M and to pivit the arm 8a of the detector 8. As clearly shown in FIG. 3, the line which is tangent to the wheels 3, 4 in the nip of these wheels is inclined forwardly and downwardly so that the wheels 3, 4 induce the web 1 to enter the magazine M and to form therein one or more loops which pivot the arm 8a to the extent which is proportional to the overall length of the web portion in the space between the frame 6 and shroud 7.

If the magazine M continues to receive the web 1 from transporting wheels 3, 4 while a splice extends into the space between the portions 13c, 13d of the intercepting device 13, the looped portions of the web ultimately disengage the splice from the device 13 and such splice is straightened out when the web is caused to advance beyond the feeding station A.

The web which advances between the extension 7a and guide member 12 is flanked by lateral guide elements 14 of the type disclosed, for example, in German Offenlegungsschrift No. 2,039,205. These guide elements hold the web against sidewise movement and insure that the web is accurately centered during exposure to printing light at the copying station between the feeding stations A and B. The construction of components at the copying station forms no part of the present invention. All that counts is to insure that such components offer little or no resistance to lengthwise movement of the web 1 when the wheels 15, 16 at the feeding station B rotate to draw the web from the magazine M. To this end, the copying station is preferably constructed and assembled in a manner as disclosed in the aforementioned copending application Ser. No. 396,457 of Goetze, et al., which describes a pressure plate movable up and down by a rotary electromagnet. The pressure plate engages that portion of the web which registers with a light-admitting window at the copying station but is lifted above and away from the web before the web is set in motion.

The parts at the feeding station B are similar to the parts at the station A and many thereof are denoted by similar reference characters each followed by a prime. The difference is that the transporting wheels 15, 16 are controlled to advance the web 1 by increments of predetermined length so as to place successive unexposed portions of emulsion at the underside of the web 1 into register with the aforementioned window at the copying station. The arrangement is preferably such that the wheel 15 rotates with an apertured disc 15a whose apertures are scanned by a photoelectric detector 15b serving to transmit signals to a suitable counter 15c which arrests the motor 15d for the wheel 15 when the web 1 has been advanced by the length of a frame.

The guide member 12' is longer than the guide member 12 and comprises an arcurate intermediate portion 12A' which surrounds the transporting wheel 16. The underside of that portion of the guide member 12' which is located immediately ahead of the arcuatae portion 12A' is disposed at a level below the axis of the wheel 16 so that the guide member 12' compels the leader of a fresh web 1 to enter the nip of the wheels 15, 16 and to thereupon enter the magazine M'. The channel 2 at the station A corresponds to a similar channel which is defined by the leftmost portion of the guide member 12' and a lower guide member 107' located to the left of the transporting wheels 15, 16. The guide member 12' is preferably pivotable to and from the illustrated operative position, for example, by being secured to the frame of the copying machine by a hinge corresponding to the hinge 12d at the station A.

If the axial length of the wheel 16 is less than the distance between the sidepieces of the guide member 12', the height of the arcuate portion 12A' can be reduced so that this portion extends only slightly above the shaft of the wheel 16.

Figure 4:
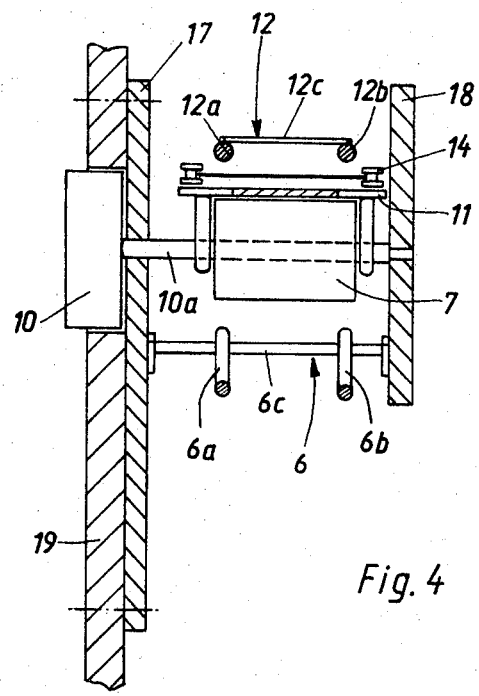
FIG. 4 is a sectional view as seen in the direction of arrows from the line IV—IV of FIG. 1.

FIG. 4 shows that the stationary and moving parts at the feeding station A are installed between a relatively large rear stationary carrier or platen 17 and a smaller front carrier or platen 18 which is secured to the platen 17 by several horizontal distancing bolts, not shown.

The platen 17 is screwed, bolted or otherwise fastened to a frame member 19 of the copying machine. In FIG. 1, the front platen 18 has been omitted for the sake of clarity. Since the platen 18 is smaller than the platen 17, several parts at the feeding station A are readily observable and accessible in fully assembled condition of the copying machine. The platens 17, 18, the distancing bolts and the parts between the platens can be assembled to form a prefabricated module which is thereupon fastened to the frame member 19. This simplifies the assembly and renders it possible to replace a defective module with a satisfactory module with little loss in time. The electrical components in or on the module including the platens 17, 18 can be connected with a receptacle or another suitable energy source by a single plug.

The assembly of some or all of the parts at the station A into a single module exhibits a number of important advantages. The module can be tested and adjusted prior to mounting in the frame of a copying machine; also, the transport of an operative module to a processing laboratory or the transport of a defective module to the repair shop is simpler than the transport of dismantled modules; moreover, the installation of prefabricated and pretested modules can be carried out by semiskilled workmen.

It is clear that the parts at the feeding station B can also form a prefabricated module. In fact, the platen 17 can be made large enough to support the parts at the stations A, B as well as one or more parts at the copying station.

The operation is as follows:

When the copying machine is idle, the flaps 11 and 11' at the feeding stations A and B assume the positions which are shown by broken lines so that they expose the openings 106 and 106' at the upper ends of the respective magazines M and M'. The copying machine is assumed to be empty, i.e., there is no paper in the path between the left-hand end of the channel 2 and the right-hand end of the channel between the guide members 12', 107' at the station B.

If the copying machine is to be started, the operator depresses a button (not shown) on the control panel to energize the electromagnets 10 and 10' so that the flaps 11 and 11' are pivoted clockwise and assume the positions shown in FIG. 1 by solid lines to thereby seal the openings 106 and 106' at the upper ends of the respective magazines. If desired, such energization of the electromagnets 10, 10' can be initiated by the microswitch 9 whose arm 9a is pivoted clockwise in response to introduction of the leader of a fresh web 1 into and beyond the channel 2 at the feeding station A. It is further clear that a discrete microswitch can be installed at the left-hand end or in an intermediate portion of the channel 2 to energize the electromagnets 10, 10' before the leader of a fresh web 1 reaches the nip of the transporting wheels 3, 4.

The motor 104 for the transporting wheel 4 is started in response to actuation of the microswitch 9 so that the wheels 3, 4 entrain the leader of the fresh web 1 and advance the leader in the gap between the guide member 12 and flap 11 (see FIG. 2) whereby the intercepting portion 13c cannot obstruct the entry of the leader into the space between the guide member 12 and extension 7a of the shroud 7.

The wheels 3, 4 continue to transport the leader in the space between the lateral guide elements 14 and through and beyond the copying station between the feeding stations A and B. The leader thereupon enters the channel between the guide members 12' and 107' at the station B and reaches the nip of the transporting wheels 15, 16. The transporting wheel 15 is driven at the speed of the wheel 4 so that the fresh web advances in the gap between the guide member 12' and flap 11', above the extension 7a' of the shroud 7', and into the takeup cassette (not shown) which is located to the right of the feeding station B. The takeup cassette can be constructed in a manner as disclosed, for example, in German Offenlegungsschrift No. 2,165,499. The wheels 4 and 15 can be arrested in automatic response to attachment of the leader of a fresh web to the core of the reel in the takeup cassette. Thus, the wheels 4 and 15 are arrested when a length of the fresh web 1 extends all the way from the supply cassette 20 at the left-hand end of the feeding station A to the core of the reel in a takeup cassette at the right-hand end of the feeding station B. If desired, and in order to achieve savings in the material of the web, the making of exposures at the copying station between the stations A and B can be started as soon as the leader of the fresh web reaches the nip of the transporting wheels 15, 16.

The flaps 11 and 11' are caused or allowed to assume their broken-line (inoperative) positions in response to or after attachment of the leader to the core of the reel in the takeup cassette. The arrangement may be such that the eletromagnets 10, 10' are deenergized in response to stoppage of the motors for the wheels 4, 15 upon completed threading of the leader through the copying machine. However, and as disclosed in the aforementioned copending application Ser. No. 396,457 of Goetze, et al., the electromagnets 10 and 10' may be energized only for such short intervals of time as are needed to lift the flaps 11, 11' to the operative positions and are thereupon deenergized while the flaps remain in operative positions under the retaining action of suitable locking bolts in the form of leaf springs or the like. In such copying machine, the modules at the stations A and B can be provided with discrete means (e.g., suitable electromagnets) for disengaging the locking bolts from the respective flaps when the flaps should be allowed to reassume their inoperative positions.

When the threading of the leader of a fresh web 1 is completed and the motors 104, 15d for the wheels 4 and 15 are at a standstill, the motor 104 for the wheel 4 is started again, when necessary, by the detector 8 whose arm 8a monitors the quantity of paper stock in the magazine M. As explained above, the sensor 8c produces a signal when the magazine M is practically empty and the sensor 8d produces a signal when the magazine M is filled. Thus, the signal from the sensor 8c starts and the signal from the sensor 8d arrests the motor 104 for the transporting wheel 4.

When the making of prints at the copying station is started, the transporting wheel 15 is driven intermittently, always through such an angle as to place an unexposed portion of emulsion at the underside of the web 1 into register with the window at the copying station. Thus, the supply of web in the magazine M is depleted stepwise and the detector 8 takes care of replenishing such supply whenever the sensor 8c produces a signal, and of terminating the feed of web into the magazine M in response to a signal from the sensor 8d. In this way, the magazine M invariably contains enough material to enable the wheels 15, 16 to draw predetermined lengths of the web through the copying station.

The detector 8' for the magazine M' controls a device which rotates the reel in the takeup cassette for exposed web 1. The reel is rotated to collect the web whenever the magazine M' is filled to capacity (signal from the sensor 8d') and is arrested when the supply of web in the magazine M' is depleted to a minimum value (signal from the sensor 8c').

An advantage of the improved feeding means is that the transporting wheels 15, 16 can rapidly accelerate the web 1 to a high speed and can be brought to a full stop at the exact moment when the foremost unexposed portion of emulsion at the underside of the web registers with the window at the copying station. This is due to the fact that the inertia of the web between the magazine M and the wheels 15, 16 is negligible. It will be noted that the web is looped in the magazine M which also contributes to the facility with which the web can be fed lengthwise through the copying station. Since the web offers minimal resistance to acceleration by the wheels 15 and 16, it can be moved lengthwise without any slippage. The surfaces of guide members which contact the web between the magazine M and the transporting wheels 15, 16 are preferably polished to a high degree of smoothness so that the friction between the web and such guide members is negligible. Still further, and as shown for the sidepieces 12a, 12b of the guide member 12 shown in FIG. 4, the web is in mere linear contact with the guide member 12' so that this also reduces the resistance which the web offers to lengthwise movement in response to rotation of the wheels 15 and 16.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic copying machine wherein a web of photographic material is advanced lengthwise in a predetermined direction along an elongated path, a combination comprising a plurality of first guide members flanking said path at opposite sides and defining an opening through which an intermediate portion of a web in said path may extend from said path; a magazine adjacent to said opening and positioned to receive that intermediate portion of a web in said path which extends from said path through said opening, said magazine having confining means contacting one side of the web portion in said magazine; first transporting means located ahead of said opening, as considered in said direction, and arranged to feed the web lengthwise so that the length of the web portion in said magazine increases when the rate at which the web is being fed into said magazine by said first transporting means exceeds the rate of withdrawl of the web from said magazine; second transporting means located downstream of said opening and arranged to intermittently draw the web from said magazine; and a second guide member movable between first and second positions in which said second guide member respectively prevents and permits the web in said path to enter said magazine through said opening.

2. A combination as defined in claim 1, wherein said confining means constitutes a basket for the web portion in said magazine.

3. A combination as defined in claim 1, wherein each of said transporting means comprises a pair of rotary transporting members and the transporting members of each of said pairs are located at the opposite sides of said path.

4. A combination as defined in claim 1, further comprising detector means arranged to monitor the length of the web portion in said magazine and to produce signals indicative of said length, and drive means for at least one of said transporting means, said drive means being responsive to said signals so as to start the respective transporting means when the length of said web portion reaches a first predetermined value and to arrest the respective transporting means when the length of said web portion reaches a second predetermined value.

5. A combination as defined in claim 1, wherein said confining means comprises a pair of substantially parallel sidepieces and a plurality of transversely extending crosspieces secured to said sidepieces, said sidepieces engaging said one side and extending lengthwise of the web portion in said magazine.

6. A combination as defined in claim 5, wherein said sidepieces are elongated rods and the distance between said sidepieces is less than the width of the web in said path.

7. A combination as defined in claim 5, wherein said sidepieces include arcuate and straight portions, said opening having a front end and a rear end, as considered in said predetermined direction, and said arcuate and straight portions of said sidepieces being respectively adjacent to said front and rear ends of said opening.

8. A combination as defined in claim 1, wherein said first transporting means comprises a pair of rotary transporting members located at the opposite sides of said path and arranged to feed the web into said magazine through said opening.

9. A combination as defined in claim 8, wherein a line which is tangent to and is disposed between said rotary members extends into said opening.

10. A combination as defined in claim 1, wherein said guide members define a second opening located downstream of said second transporting means and further comprising a second magazine adjacent to said second opening and arranged to receive a portion of a web in said path in response to operation of said second transporting means.

11. A combination as defined in claim 1, wherein said first guide members include an elongated guide member located opposite said opening and comprising a pair of substantially parallel sidepieces which contact the web in and extend lengthwise of said path.

12. A combination as defined in claim 11, wherein said sidepieces are rods having smooth external surfaces.

13. A combination as defined in claim 11, wherein said elongated guide member is movable to and from a position in which said sidepieces contact the web in said path.

14. A combination as defined in claim 13, wherein said elongated guide member is pivotable.

15. A combination as defined in claim 11, wherein at least one of said transporting means comprises a pair of rotary members disposed at the opposite sides of said path and said elongated guide member comprises an arcuate portion partially surrounding one of said rotary members.

16. A combination as defined in claim 1, further comprising drive means for each of said transporting means and at least one common carrier for said first transporting means, for said drive means for said first transporting means, and for said magazine so that the means on said carrier constitute a preassembled module.

17. A combination as defined in claim 16, wherein said module further comprises detector means for monitoring the length of the web portion in said magazine.

18. In a photographic copying machine wherein a web of photographic material is advanced lengthwise in a predetermined direction along an elongated path, a combination comprising a plurality of guide members flanking said path at opposite sides and defining an opening through which an intermediate portion of a web in said path may extend from said path; a magazine adjacent to said opening and positioned to receive that intermediate portion of a web in said path which extends from said path through said opening, said magazine having confining means contacting one side of the web portion in said magazine; first transporting means located ahead of said opening, as considered in said direction, and arranged to feed the web lengthwise so that the length of the web portion in said magazine increases when the rate at which the web is being fed into said magazine by said first transporting means exceeds the rate of withdrawal of the web from said magazine; second transporting means located downstream of said opening and arranged to intermittently draw the web from said magazine; and intercepting means movable into said path in the region of said opening to intercept a folded-over portion of a web which is being fed by said first transporting means.

19. A combination as defined in claim 18, wherein said intercepting means comprises two portions which diverge from each other in a direction toward said first transporting means and define a space for entry of a folded-over portion when the respective web is being fed by said first transporting means.

20. A combination as defined in claim 18, further comprising means for moving said intercepting means from said path to an idle position in which said intercepting means is adjacent to said path opposite said opening.

21. A combination as defined in claim 20, wherein said means for moving said intercepting means comprises a second guide member which is located in said opening to thereby prevent the entry of the leader of a web into said magazine while said intercepting means is adjacent to said path, and which is withdrawn from said opening while said intercepting means extends into said path.

22. A combination as defined in claim 21, wherein said intercepting means is pivotable into and from said path and said guide member is pivotable into and from said opening.

* * * * *